(12) United States Patent
Winters et al.

(10) Patent No.: US 8,036,164 B1
(45) Date of Patent: *Oct. 11, 2011

(54) SYSTEM AND METHOD FOR SELECTING A TRANSMISSION CHANNEL IN A WIRELESS COMMUNICATION SYSTEM THAT INCLUDES AN ADAPTIVE ARRAY

(75) Inventors: Jack H. Winters, Middletown, NJ (US); Justin C. Chuang, Holmdel, NJ (US); Nelson R. Sollenberger, Farmingdale, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 846 days.

This patent is subject to a terminal disclaimer.

(21) Appl. No.: 11/457,946

(22) Filed: Jul. 17, 2006

Related U.S. Application Data

(63) Continuation of application No. 09/781,445, filed on Feb. 13, 2001, now Pat. No. 7,133,380, which is a continuation-in-part of application No. 09/480,676, filed on Jan. 11, 2000, now abandoned.

(51) Int. Cl.
*H04J 1/00* (2006.01)
*H04B 7/212* (2006.01)
*H04Q 7/20* (2006.01)

(52) U.S. Cl. ......... 370/329; 370/343; 370/347; 455/442

(58) Field of Classification Search .......... 370/389–477, 370/203–352; 375/316–362, 140–148; 455/63–69, 455/561–562, 442–450
See application file for complete search history.

(56) References Cited

U.S. PATENT DOCUMENTS

| | | | |
|---|---|---|---|
| 5,212,831 A * | 5/1993 | Chuang et al. ................. | 455/450 |
| 5,267,261 A | 11/1993 | Blakeney et al. ................. | 375/1 |
| 5,463,657 A | 10/1995 | Rice .............................. | 375/200 |
| 5,481,570 A * | 1/1996 | Winters ......................... | 375/347 |
| 5,497,505 A | 3/1996 | Koohgoli et al. .............. | 455/34.1 |
| 5,507,007 A | 4/1996 | Gunmar et al. ............... | 455/33.1 |
| 5,590,133 A | 12/1996 | Billström et al. .............. | 370/349 |
| 5,590,399 A * | 12/1996 | Matsumoto et al. .......... | 455/449 |
| 5,640,395 A | 6/1997 | Hamalainen ................... | 370/322 |
| 5,673,259 A | 9/1997 | Quick, Jr. ...................... | 370/342 |
| 5,678,181 A | 10/1997 | Kamachi ....................... | 455/33.1 |
| 5,802,465 A | 9/1998 | Hamalainen et al. .......... | 455/403 |
| 5,812,540 A | 9/1998 | Bruckert et al. ............... | 370/332 |
| 5,822,681 A * | 10/1998 | Chang et al. .................... | 455/62 |
| 5,886,988 A * | 3/1999 | Yun et al. ....................... | 370/329 |
| 6,038,272 A * | 3/2000 | Golden et al. ................. | 375/347 |
| 6,052,594 A * | 4/2000 | Chuang et al. ................. | 455/450 |

(Continued)

OTHER PUBLICATIONS

Chuang, "Performance Issues and Algorithms for Dynamic Channel Assignment," *IEEE Journal on Selected Areas in Communications*, vol. 11, No. 6, Aug. 1993, pp. 955-963.

(Continued)

*Primary Examiner* — Man Phan

(57) ABSTRACT

A method for establishing wireless communication between a transmitter and a receiver in a wireless communication system is disclosed. The receiver includes an adaptive array that has at least two antennas. Each antenna receives a signal and produces a received signal. The transmitter includes at least two transmission channels for communicating the signal from the transmitter to the receiver. The wireless communication system suppresses interference at the receiver by applying an interference suppression technique when combining the received signals. The selection of a channel at the transmitter is based on the channel performance at the receiver for each transmission channel. The channel performance is based on a combining technique different from the interference suppression technique.

16 Claims, 11 Drawing Sheets

U.S. PATENT DOCUMENTS

| | | | | |
|---|---|---|---|---|
| 6,052,596 | A * | 4/2000 | Barnickel | 455/450 |
| 6,363,099 | B1 * | 3/2002 | Sakoda et al. | 375/131 |
| 6,415,149 | B1 * | 7/2002 | Bevan et al. | 455/442 |
| 6,445,757 | B1 * | 9/2002 | Raitola et al. | 375/347 |
| 6,522,642 | B1 * | 2/2003 | Scott | 370/342 |
| 6,597,927 | B1 * | 7/2003 | Eswara et al. | 455/562.1 |
| 6,640,104 | B1 * | 10/2003 | Borst et al. | 455/450 |
| 6,686,879 | B2 * | 2/2004 | Shattil | 342/367 |
| 6,687,492 | B1 * | 2/2004 | Sugar et al. | 455/276.1 |
| 6,757,524 | B1 * | 6/2004 | Hartikainen et al. | 455/101 |
| 6,771,988 | B2 * | 8/2004 | Matsuoka et al. | 455/562.1 |
| 6,782,039 | B2 * | 8/2004 | Alamouti et al. | 375/147 |
| 6,795,424 | B1 * | 9/2004 | Kapoor et al. | 370/343 |
| 6,853,629 | B2 * | 2/2005 | Alamouti et al. | 370/330 |
| 6,873,651 | B2 * | 3/2005 | Tesfai et al. | 375/219 |
| 6,965,762 | B2 * | 11/2005 | Sugar et al. | 455/276.1 |
| 6,975,666 | B2 * | 12/2005 | Affes et al. | 375/130 |
| 7,092,431 | B2 * | 8/2006 | Maeda et al. | 375/144 |
| 7,099,299 | B2 * | 8/2006 | Liang et al. | 370/342 |
| 7,123,667 | B2 * | 10/2006 | Nagayasu | 375/316 |
| 7,133,380 | B1 * | 11/2006 | Winters et al. | 370/329 |
| 7,161,974 | B2 * | 1/2007 | Mehrabani et al. | 375/148 |
| 7,236,452 | B2 * | 6/2007 | Maeda et al. | 370/210 |
| 7,245,881 | B2 * | 7/2007 | Sugar et al. | 455/69 |
| 7,386,077 | B2 * | 6/2008 | Alamouti et al. | 375/347 |
| 2002/0105928 | A1 * | 8/2002 | Kapoor et al. | 370/334 |
| 2003/0156570 | A1 * | 8/2003 | Alamouti et al. | 370/347 |

OTHER PUBLICATIONS

Chuang et al., "Performance of Autonomous Dynamic Channel Assignment and Power Control for TDMA/FDMA Wireless Access," *IEEE Journal on Selected Areas in Communications*, vol. 12, No. 8, Oct. 1994, pp. 1314-1323.

Chuang et al., "A Pilot-Based Dynamic Channel Assignment Scheme for Wireless Access TDMA/FDMA Systems," *International Journal of Wireless Information Networks*, vol. 1, No. 1, 1994, pp. 37-48.

Srivastava et al., "Packetized Wireless Access for Data Traffic in Frequency Reuse Environments," *PIMRC*, 1996, pp. 1150-1154.

Srivastava et al., "Access Algorithms for Packetized Transmission in the Presence of Co-Channel Interference," *IEEE*, 1996, pp. 121-125.

Baiocchi et al., "The Geometric Dynamic Channel Allocation as a Practical Strategy in Mobile Networks with Bursty User Mobility," *IEEE Transactions on Vehicular Technology*, vol. 44, No. 1, Feb. 1995, pp, 14-23.

Borgonovo et al., "Capture Division Packet Access: A New Cellular Access Architecture for Future PCNs", *IEEE Communications Magazine*, Sep. 1996, pp. 154-162.

Borgonovo et al., "Capture-Division Packet Access for Wireless Personal Communications," *IEEE Journal on Selected Areas in Communications*, vol. 14, No. 4, May 1996, pp. 609-621.

Dunlop et al., "Performance of a Statistically Multiplexed Access Mechanism for a TDMA Radio Interface," *IEEE Personal Communications*, Jun. 1995, pp. 56-64.

Frullone et al., "PRMA Performance in Cellular Environments with Self-Adaptive Channel Allocation Strategies," *IEEE Transactions on Vehicular Technology*, vol. 45, No. 4, Nov. 1996, pp. 657-665.

Akaiwa et al., "Channel Segregation-A Self-Organized Dynamic Channel Allocation Method: Application to TDMA/FDMA Microcellular System," *IEEE Journal on Selected Areas in Communications*, vol. 11, No. 6, Aug. 1993, pp. 949-954.

DeRose, "Coverage Versus Capacity", *The Wireless Data Handbook*, Chapter 10, pp. 169-183.

Ludwig, "Downlink Performance of the General Packet Radio Service for GSM" Proceedings MoMuC-3, $3^{rd}$ Intn'l Workshop of Mobile Multimedia Communications, Princeton, NJ, Sep. 25-27, 1996, pp. 1-4.

Rappaport, *Wireless Communication, Principles & Practice*, pp. 455-458.

Dunlop et al. "A Key Feature of the RACE Mobile R2084 Advanced TDMA Project, Performance of a Statistically Multiplexed Access Mechanism for a TDMA Radio Interface", IEEE Personal Communications, Jun. 1995, pp. 56-64.

Jabbari at al. "Dynamic Slot Allocation for TDMA-Systems with Packet Access", *Multiaccess, Mobility and Teletraffic for Personal Communications*, pp. 103-117.

Cimini, Jr. et al. "OFDM with Diversity and Coding for High-Bit-Rate Mobile Data Applications", Proceedings MoMuC-3, $3^{rd}$ Intn'l Workshop on Mobile Multimedia Communications, Princeton, NJ, Sep. 25-27, 1996.

Litva et al. "Digital Beamforming in Wireless Communications," *Mobile Communications Series*, 1996, pp. 13-55.

* cited by examiner

SYSTEM AND METHOD FOR SELECTING A TRANSMISSION CHANNEL IN A WIRELESS COMMUNICATION SYSTEM THAT INCLUDES AN ADAPTIVE ARRAY

CROSS-REFERENCE TO RELATED APPLICATIONS

This application for letters patent is a continuation of U.S. patent application Ser. No. 09/781,445, filed Feb. 13, 2001, now issued as U.S. Pat. No. 7,133,380, which is a continuation-in-part of U.S. patent application Ser. No. 09/480,676, filed on Jan. 11, 2000, now abandoned. The assignee is the same in all of these applications.

FIELD OF THE INVENTION

The present invention relates generally to a wireless telecommunications system and method. More particularly, the present invention relates to a method for establishing wireless communication between a transmitter and a receiver in a wireless communication system that includes an adaptive array.

BACKGROUND OF THE INVENTION

Cellular radio services have been extremely successful in providing untethered voice communications. With the advent of new personal communications services, wireless access is expected to become even more popular. At the same time, personal computers and Internet services are experiencing explosive growth due to low cost, high performance computer technologies and attractive network applications. The popularity of the World Wide Web is further accelerating the explosive growth of personal computers and Internet services. Advanced Cellular Internet Services (ACIS) are targeted for applications, such as web browsing, which have a peak downlink data rate on the order of 1-2 Mb/s using a wide-area cellular infrastructure.

A major obstacle for wireless data services is the capability of cellular networks for providing a transporting bandwidth sufficiently high for meeting the needs of web browsing and information exchange applications. For example, the bandwidth requirements for two-way Internet radio links are expected to be highly asymmetric. That is, a peak downlink data rate of about 2 Mb/s is expected, with an uplink peak data rate of about one to two orders of magnitude less. Further, since there is a need for providing both voice and data services using a limited frequency spectrum, the algorithm used for channel assignment must aggressively reuse frequency to within a fraction of the total available bandwidth.

Further, ACIS poses several technical challenges in the area of medium access control (MAC) methodology. A suitable MAC method for ACIS must address not only packet server allocation (base station, antenna sector, radio transceiver and time slot), but also channel assignment for a given server. That is, a suitable MAC protocol must consist of two parts, an access protocol, and a channel assignment algorithm that handles the asymmetric uplink/downlink bandwidth expectations and the aggressive frequency reuse issues, respectively. The access protocol part of the MAC protocol is similar to a conventional wireline-based access protocol in that it must avoid "hard" collisions in the same cell, while the channel assignment part must avoid "soft" collisions among different cells caused by co-channel interference.

Further still, a suitable ACIS MAC protocol must also handle diverse types of multimedia traffic having different Quality of Service (QoS) requirements. For example, delay-sensitive traffic, such as packet voice traffic, and error-sensitive traffic, such as packet data traffic ranging from signaling a simple command to downloading a large image file, must be assigned radio resources that meet specific requirements. Accordingly, when packet access techniques are used, radio resources, that is, channels, are assigned only when there are packets to be delivered. The price of the advantages obtained by this statistical multiplexing is a rapidly changing interference environment. Thus, a circuit-access channel assignment method that is based on continuous interference measurement and averaging may not achieve desirable results in a packet switched system because the interference environment measured may be significantly changed when actual transmissions occur, such as that disclosed by M. Frullone et al., "PRMA Performance In Cellular Environments with Self-Adaptive Channel Allocation Strategies," IEEE Trans. Veh. Tech., November 1996, pp. 657-665. The time delay occurring between measurement and transmission, known as "setup latency", has detrimental effects on system performance unless some "inertia" is introduced for reducing interference variations.

Existing wireless data rates of up to several tens of kb/s may be more than an order of magnitude short of what is required to make popular web browsing and information exchange applications user-friendly when used with wireless access. For example, see J. F. DeRose, "The Wireless Data Handbook," Quantum Publishing, Inc., 1994. Although there are approaches that propose providing up to about 100 kb/s peak rates using second-generation digital cellular technologies, such as the General Packet Radio Service (GPRS) for the GSM system, such approaches usually aggregate several traffic servers (e.g., multiple time slots in TDMA systems) as a single high-rate data server using conventional frequency reuse strategies. See, for example, R. Ludwig, "Downlink Performance of the General Packet Radio Service for GSM," Proceedings, 3rd International Workshop on Mobile Multimedia Communications (MoMuC3), Paper # A.2.2.3, September 1996. Approaches that use multiple time slots for providing a single high-rate data server consume significant portions of system capacity and would seriously compromise traditional voice services when high-speed wireless data services become popular.

Presently, there are wireless Ethernet modems that provide several Mb/s or higher peak data rates for local environments. For example, see A. R. Nix, "Hiperlan Compatible Modulation and Equalisation Techniques—What are the real choices," ETSI RES-10 standard contribution RES-10TTG/93/78, December 1993. The feasibility of even higher data rates has been demonstrated by some wireless ATM hardware prototypes. Nevertheless, peak data rates of several Mb/s have not been demonstrated in wide-area cellular networks due to significant path loss and delay spread encountered in a cellular network environment. Furthermore, a high bandwidth requirement makes frequency reuse much more challenging in a cellular environment because the limited available spectrum cannot be easily divided into a large number of reuse channel sets.

Recently, simulations of a modulation method employing Orthogonal Frequency Division Multiplexing (OFDM), antenna diversity and channel coding have shown promise for providing 1-2 Mb/s peak downlink rates in an ACIS environment. For example, see L. J. Cimini and N. R. Sollenberger, "OFDM with Diversity and Coding for High-Bit-Rate Mobile Data Applications," Proceedings, 3rd International Workshop on Mobile Multimedia Communications, Princeton, September 1996, paper # A.3.1.1. While a number of challenges remain and a hardware implementation of a low cost, robust modem is difficult, the transmission technique appears to be feasible.

Among the useful attributes of existing approaches, interference sensing used by a measurement-based DCA approach and knowledge of preferred channels used by a channel segregation (CS) technique are advantageous for packet channel assignment. Interference sensing enables base and/or mobile stations to determine potential interference before choosing a given channel and avoiding inter-cell collisions of packets that are delivered using the same radio channel. For an example an interference measurement-based DCA approach, see J. Chuang, "Performance Issues and Algorithms for Dynamic Channel Assignment," IEEE J. Select. Areas Comm., August 1993, pp. 955-963. Channel segregation divides a radio spectrum into different groups of preferred channels through a learning process, thus preventing adjacent radio transceivers from simultaneously using the same channels. Channel assignments are made robust even when interference sensing is too slow for detecting rapid variations in packet time scale. For details regarding the original channel segregation technique, see F. Furuya et al., "Channel Segregation, A Distributed Adaptive Channel Allocation Scheme for Mobile Communications Systems," Proceedings, 2nd Nordic Seminar on Digital Land Mobile Radio Communications, October 1986, also appearing in IEICE Trans., Vol. E74, June 1991, pp. 1531-1537.

The original CS algorithm increments a priority value of a channel if the channel is successfully assigned for use and does not experience interference after communications begin. After a period of initial trial-and-error, an entire system using the original CS algorithm autonomously forms a reasonable reuse plan. The original CS algorithm is a simple algorithm, but would be more effective if failures could be reduced during the learning phase.

Without introducing memory, measurement-based DCA using two-way interference sensing is effective for circuit access even with significant setup latency. For example, see J. C.-I. Chuang and N. Sollenberger, "Performance of Autonomous Dynamic Channel Assignment and Power Control for TDMA/FDMA Wireless Access," IEEE Journal on Selected Areas in Communications, special issue on Wireless and Mobile High Speed Communication Networks, October 1994, pp. 1314-1323. A small performance degradation experienced by such an approach is the result of a non-zero probability of "soft collisions" that occur because more than one packet from nearby base stations are delivered on the same channel. As latency rises, the collision probability increases as more newly selected links are "blind" until communications begin. For packet access, duty cycle of channel usage is shortened due to resource sharing among multiple mobiles. This results in higher interference fluctuation and more frequent channel assignment. Therefore, good averaging during measurement is more difficult to achieve and the latency effect is expected to be more pronounced. However, strong non-blind interferers should still be detectable (and thus be avoidable) with a fast measurement. For measurement-based DCA to be effective in packet access, it is thus important to either reduce measurement time and avoid undue setup latency and/or make the assignment robust to setup latency. To this end, selecting channels according to a priority order reduces the impact of soft collisions even though measurements are blind during setup latency. This is because priority orders for the neighboring base stations are likely to be different if a proper ranking/updating algorithm is employed for "segregating" channels during a learning process.

Examples of existing wide-area wireless packet data services include Advanced Radio Data Information Service (ARDIS), RAM Mobile Data, Cellular Digital Packet Data (CDPD) and second-generation digital cellular networks. These conventional services generally offer raw data rates lower than 28.8 kb/s and do not reuse spectrum efficiently for packet data. Typically, wireline-based data MAC protocols are enhanced by separate radio resource management functions that perform channel assignment.

CDPD provides packet access by using cellular infrastructure. For example, see Cellular Digital Packet Data, System Specification & Implementor Guidelines, CD-ROM, Release 1.1, Jan. 19, 1995, CDPD Forum. A channel sniffing and hopping process is used for selecting idle voice channels for access. A Digital Sense Multiple Access/Collision Detection (DSMA/CD) protocol is then used for sending digital busy signals for intra-cell contention management. The basic concept is similar to the Carrier Sense Multiple Access/Collision Detection (CSMA/CD) protocol used in wireline-based LANs and the Carrier Sense Multiple Access/Collision Avoidance (CSMA/CA) protocol used in wireless LANs. No additional frequency reuse method is employed for managing inter-cell contention except for conventional frequency planning, such as is typically performed for voice services using fixed channel assignment (FCA) methods. Thus, the CDPD approach is not sufficient for ACIS applications because a large bandwidth for individual packet channels is used.

Similar to CDPD, both RAM and ARDIS use protocols that are similar to CSMA for packet access contention. Unlike CDPD, though, RAM and ARDIS both have dedicated spectra and dedicated networks for packet data communications. For example, see RAM Mobile Data System Overview, July 1996, RAM Mobile Data. The frequency reuse aspect of the RAM MAC protocol is conventional FCA and, consequently, not efficient for the ACIS environment. The ARDIS approach is similar to RAM Mobile DATA in the services offered, but the ARDIS frequency reuse scheme focuses more on providing coverage by trading off capacity. At times, more than one base station is allowed to use the same channel for reducing coverage holes. Thus, the ARDIS approach is not efficient enough for the ACIS environment.

Recently, there are research and standardization efforts for the second- and third-generation digital cellular systems for providing packet data access. As previously mentioned, the second-generation system approaches usually aggregate several traffic servers for achieving high data rates and are not suitable for the ACIS environment. On the other hand, the third-generation systems and associated research activities, e.g., the European activities on Advanced Communications Technologies and Services (ACTS) are beginning to address high-rate packet access. For example, see IEEE Personal Communications Magazine, "Special Issue on The European Path Towards UMTS," February 1995. Among initiatives of ACTS, the Advanced TDMA (ATDMA) system is of particular interest to the ACIS environment. A relatively mature proposal of the ATDMA MAC protocol is the PRMA++ protocol in which specific slots for reservation, fast paging and acknowledgement are included in every frame for performing reservation and release of packet traffic servers. Details are disclosed by J. Dunlop et al., "Performance of a Statistically Multiplexed Access Mechanism for a TDMA Radio Interface," IEEE Personal Communications Magazine, June 1995, pp. 56-64. The PRMA++ protocol enhances the original Packet Reservation Multiple Access (PRMA) disclosed by D. Goodman et al., "Packet Reservation Multiple Access for Local Wireless Communications," IEEE Trans. on Commun., August 1989, pp. 885-890, by reducing or eliminating intra-cell traffic packet collisions and accelerating the setup process.

F. Borgonovo et al. disclose a similar approach by using slots with different functionalities. A hybrid polling and reservation scheme is introduced that further reduces contention of uplink traffic by allowing a base station to poll its active mobiles. See F. Borgonovo et al., "Capture-Division Packet Access for Wireless Personal Communications," IEEE Journal on Selected Areas in Communications, May 1996, pp. 609-622, and F. Borgonovo et al., "Capture-Division Packet Access: A New Cellular Access Architecture for Future PCNs," IEEE Communications Magazines, September 1996, pp. 154-162. Frequency reuse is achieved by capture effects and a flexible frame structure is adaptively formed based on the varying rates of polled users with different QoS requirements. The approach does not use a conventional TDMA frame structure and, consequently, was termed "Capture Division Packet Access (CDPA)." However, both PRMA++ and CDPA do not specify a detailed channel assignment algorithm and methods for effective frequency reuse in packet access remains an area of active research worldwide. For example, see M. Frullone et al., supra; A. Baiocchi et al., "The Geometric Dynamic Channel Allocation as a Practical Strategy in Mobile Networks with Bursty User Mobility," IEEE Transactions on Vehicular Technology, February 1995, pp. 14-23; A. Srivastava and J. Chuang, "Access Algorithms for Packetized Transmission in the presence of Co-channel Interference," IEEE VTC '96, Atlanta, Ga., April 1996, pp. 121-125; A Srivastava and J. Chuang, "Packetized Wireless Access for Data Traffic in Frequency Reuse Environments," Seventh International Symposium on Personal Indoor Mobile Radio Communications (PIMRC), Taipei, Taiwan, October 1996, pp. 1150-1154; and T. Benker, "Dynamic Slot Allocation for TDMA-Systems with Packet Access," Multiaccess, Mobility and Teletraffic for Personal Communications," B. Jabbari, P. Godlewski and X. Lagrange (Editors), Kluwer Academic Publishers, 1996, pp. 103-116.

The Frullone et al. publication, supra, and both Srivastava et al. publications, supra, consider the effects of co-channel interference using the PRMA protocol and propose methods for trading signal quality for traffic throughput. Both groups of researchers considered choosing only a subset of available channels at a base station for contention, with a larger subset of available channels resulting in a better throughput with possible quality degradation than with a smaller subset of available channels. Frullone et al. employed channel segregation, initially proposed by Furuya et al., supra, for prioritizing all available channels through a learning process that is based on the probability of access success, that is, no hard collisions caused by intra-cell contention and no soft collisions caused by co-channel interference during a talkspurt. After a certain period of training time, adjacent base stations tend to have different sets of preferred channels, thus achieving adaptive frequency reuse. The Frullone et al. approach improves frequency reuse even under the rapidly changing interference of the packet access environments. Nevertheless, the disadvantage of this approach is that it is not easy to avoid interference during the learning process, i.e., bad channels are avoided only after failure occurs.

Srivastava et al., supra, propose that a base station broadcasts a subset of channels having the lowest interference for all associated mobile stations for contending access based on continuously sensing uplink interference. This is realized by associating with each channel a "permission probability." Highly interfered-with channels are given zero permission probability, thus preventing such channels from been used. Fuzzy logic is used for determining the permission probability based on the prevailing interference conditions and the number of idle slots at the base station. An access request is sent by a mobile station only when a locally generated random number is lower than the permission probability. This approach achieves good delay and throughput characteristics for both packet voice and data applications using a simple set of intuitive control rules. However, only the uplink access issue is addressed, which is less challenging in ACIS applications because of the asymmetrical uplink/downlink bandwidth requirements. Additionally, downlink transmission is assumed to be continuous for facilitating rapid access, possibly requiring more spectrum than that available in an ACIS environment because continuous downlinks represent 100% downlink spectral usage and results in high interference levels.

To improve signal quality on both links, J. Chuang, "Performance Issues and Algorithms for Dynamic Channel Assignment," IEEE J. Select. Areas Comm., August 1993, pp. 955-963, discloses a two-way dynamic channel assignment algorithm for circuit-access environments. A pilot-based scheme and its frame structure were proposed for implementing this approach with low latency and no blind slots. Also see J.C.-I. Chuang et al., "A Pilot Based Dynamic Channel Assignment Scheme for Wireless Access TDMA/FDMA Systems," The International Journal of Wireless Information Networks, Vol. 1, No. 1, January 1944, pp. 37-48. Similar to the approach disclosed by Srivastiva et al., "Access Algorithms for Packetized Transmission in the presence of Co-channel Interference," IEEE VTC '96, Atlanta, Ga., April 1996, pp. 121-125, the J.C.-I. Chuang et al. approach requires base stations to continuously monitor the uplink and broadcast lists of good idle channels on a control frequency, thereby avoiding continuous downlink transmission on the traffic channels. Upon receiving the good idle channel list, a mobile station measures interference on the candidate channels and selects a channel with sufficiently low interference, thus achieving good quality in both directions. This requires significant measurement and feedback transmission by the mobiles, but the advantages are significant. For the ACIS environment, however, it is not clear whether the required functionalities can be performed fast enough for taking full advantage of this approach. Furthermore, a control scheme must be devised for providing a mechanism for logical pairing or feedback for both directions, and which must be performed for typically asymmetric two-way traffic.

An adaptive array beamformer is a device that separates signals collocated in the frequency band but separated in the spatial domain. This provides a means for separating a desired signal from interfering signals. The adaptive array beamformer automatically optimizes the array pattern by adjusting the elemental control weights until a prescribed objective function is satisfied. A specially designed algorithm provides the means for achieving the optimization. An adaptive array is beneficial for a modern wireless communication system because it has the advantage of increasing the power available to the desired receiver. This is particularly beneficial for a code division multiple access (CDMA) system because the interference received by another receiver in an adjacent area is significantly reduced relative to conventional omni-directional or sectored transmissions.

An adaptive array includes a collection of transmitters and receivers coupled to a corresponding element of the antenna array. The received beamform is determined by measuring the power and relative phase of a desired signal received on each antenna element and its corresponding receiver. The transmit beam is formed by varying the relative phase and power of each signal transmitted by the multitude of transmitters and corresponding antenna elements.

An adaptive array includes a collection of antenna elements. A weighting algorithm processes the signal received by each antenna element to produce a weighted signal. The weighted signals from the antenna elements are synthesized to form a synthesized pattern. The weighting algorithm is chosen to achieve a specific purpose or amount of weighting. For example:

1. Least-Mean-Squared (LMS)—A method in which the weighting is determined so as to minimize the root error component of a received signal with reference to a known reference signal;
2. Maximum Signal-to-Noise Ratio (MSN)—A method in which the Signal-to-Noise Ratio (SNR) is maximized with a known direction of a desired wave;
3. Power Inversion (PI)—A method in which a strong jamming wave signal is suppressed by the minimization of received power in, for example, reception of a frequency diffusion modulation signal; and
4. Constant Modulus Algorithm (CMA)—A method in which an interference wave is suppressed by utilizing the constant envelope property of an amplitude component of a frequency-modulated or a phase-modulated signal, are proposed.

The adaptive array beamforming process is simplified in a time division duplex (TDD) system because the communications to and from an adaptive array occur on a common frequency but during a different time slot. This enables the adaptive array to create a transmit beam pattern substantially equal to a beam pattern received by the adaptive array. In a frequency division duplex (FDD) system, however, transmissions and receptions occur on different frequencies, having different propagation paths. The beamform of a TDD system is more accurately formed because the transmit and receive propagation characteristics are substantially the same.

What is needed is a wireless communication system that includes an adaptive array in the receiver, the transmitter, or both. By taking advantage of the benefits of an adaptive array, a wireless communication system will improve the performance in the channel selected. With the prior art, channel selection is based on the interference level of each channel after adaptive array combining, and since adaptive arrays suppress interference, the wireless communication system with adaptive arrays using the prior art optimizes the performance of a given link by selecting the channel with the lowest interference. However, an adaptive array can substantially suppress interferers, but only when the number of interferers is less than the number of antennas. Thus, with the adaptive array the channel selection process of the prior art can place interferers close together. If this results in too many interferers on another link, the performance of that link may be seriously degraded. As a result, the above channel selection process can result in overall system performance that is worse than without an adaptive array.

SUMMARY OF THE INVENTION

The present invention is a wireless communication system and a method for establishing wireless communication between a transmitter and a receiver in the wireless communication system. The receiver includes an adaptive array that has at least two antennas. Each antenna receives a signal and produces a received signal. The transmitter includes at least two transmission channels for communicating the signal from the transmitter to the receiver. The wireless communication system suppresses interference at the receiver by applying an interference suppression technique when combining the received signals. To have the channel assignment not place interferers close together, the channel is selected that has the best performance (e.g., the lowest interference) without interference suppression at the receiver.

Other aspects and advantages of the invention will become apparent from the following detailed description and accompanying drawing, illustrating by way of example the features of the invention.

BRIEF DESCRIPTION OF THE DRAWINGS

The accompanying figures best illustrate the details of the present invention, both as to its structure and operation. Like reference numbers and designations in these figures refer to like elements.

DETAILED DESCRIPTION OF THE INVENTION

Figure 1:
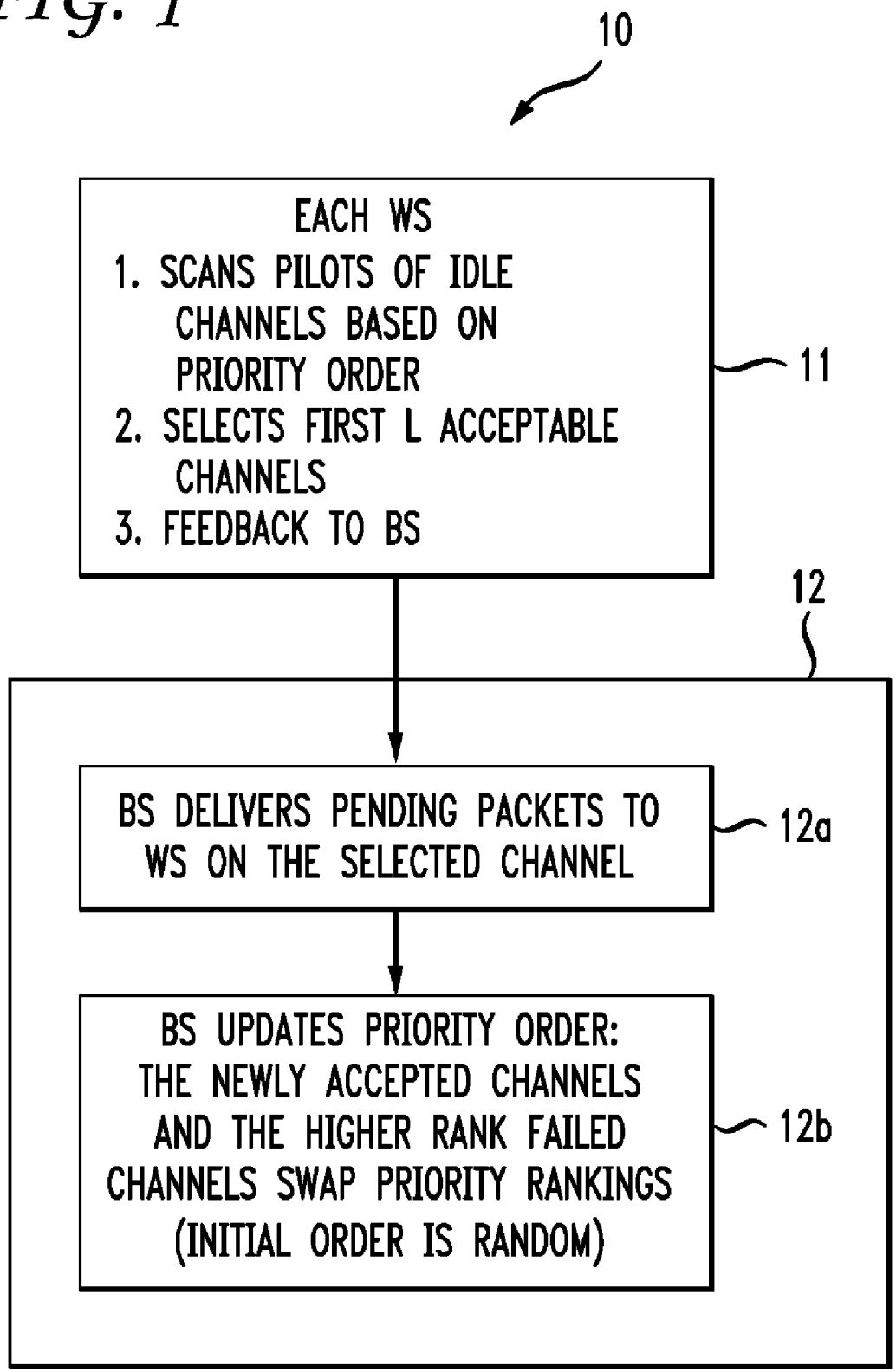
FIG. 1 is a flow diagram of the overview of the basic assignment process according to the present invention.

For measurement-based Dynamic Channel Assignment (DCA) to be effective in packet access, it is important to (1) reduce measurement time and avoid undue setup latency, (2) make the assignment robust to setup latency, and (3) completely eliminate blindness to interference in the sensing process, if possible. The invention is successful in all three aspects. If (3) is not implemented, (1) and (2) together can still be very effective in reducing interference.

To achieve (1), we introduce a "pilot" scheme, which maps the interference on the candidate channels conveniently together onto a pre-determined set of time and frequency segments, enabling a rapid simultaneous interference measurement. The pilot scheme introduced herein provides a mechanism for mobile stations to obtain rapid interference measurements. The same pilot signals can also be transmitted by the mobile stations, which allow base stations that use adaptive arrays to monitor and avoid interference in the reverse (uplink) direction. One embodiment of this pilot scheme is exemplified later in an OFDM based system wherein a Fast Fourier Transform (FFT) performed over a short time segment can accelerate simultaneous interference measurement for all candidate channels using the well-known FFT algorithm, which is a basic signal-processing function in digital signal processors (DSP's). In many other instances, the FFT algorithm is also employed to take advantage of this readily available DSP function, but the applications may be quite different.

To achieve (2), selecting channels according to a priority order, similar to CS, reduces the impact of soft collisions even though measurements are blind during setup latency. This is because priority orders for the neighboring base stations are likely to be different if a proper ranking/updating algorithm is employed for "segregating" channels during a learning process.

Finally, to achieve (3), we introduce a method for adjacent base stations that use adaptive arrays to perform interference measurements and channel assignment with a staggered schedule. By properly performing different channel assignment functions at different times, adjacent base stations can always avoid interference generated by other base stations without any blind spots. The same scheduling method also allows periodic updates of channel assignment such that the assignment does not become obsolete in the rapidly changing packet access environments.

To provide Internet access using existing wide-area cellular infrastructure with 1-2 Mb/s peak downlink rates, the present invention provides a Dynamic Channel Assignment (DCA) process that is performed when a downlink queue for a wireless station has data packets for delivery, but have not yet been assigned a radio channel for downlink transmission. The entire process of assigning channels and downloading packets is referred to herein as Dynamic Packet Assignment (DPA). Once a channel is assigned for downlink transmission of the data packets to the wireless station, the channel is reserved until all data packets in the queue are delivered, or until another DPA update is performed by a base station. Thus, the system overhead associated with frequent channel assignment processing is minimized.

According to the invention, a wireless station, such as a mobile station or a wireless terminal, performs interference measurements for determining acceptable channels, from the point of view of the wireless station, after the wireless station has been informed by a base station of pending data packets for delivery to the wireless station. The wireless station scans a pilot signal frequency band using a fast Fourier transform (FFT) technique for detecting pilot signals that respectively correspond to channels that are currently being used for downlink transmission. A feedback channel is then used for informing a base station of acceptable channels. To avoid more than one wireless station in the same cell from selecting the same acceptable channel, a list of more than one acceptable channel is provided by the wireless station.

An adaptive channel priority scheme is used at the base station for updating a channel priority order for the wireless station by swapping the priority positions of the channels determined to have acceptable quality with higher ranking channels failing the interference measurement test. This feature of the present invention allows preferred channels for a wireless station to be learned by the base station by employing "interference look-ahead" and thus avoiding bad channels having a high ranking in the priority order for the wireless station.

FIG. 1 shows a flow diagram showing the overview of the basic measurement-based Dynamic Packet Assignment (DPA) process 10 for downlink transmission according to the present invention. Initially, the priority order of channels for downlink transmission for all wireless stations associated with a particular base station radio transmitter is randomly assigned. The priority order is a list of channels maintained at a base station that are scanned by wireless stations, whether mobile or fixed, that are associated with the base station when a mobile station determines the availability of downlink channels. When there are multiple radios at a base station, there are separate priority orders for each radio. The priority order is included in a paging message that is broadcast to all wireless stations. When a wireless station (WS) receives a paging message from a base station (BS) indicating that the base station has received packets for downlink transmission to the wireless station, the wireless station scans pilot frequency signals at 11 for idle channels based on the priority order, starting with the channel having the highest priority ranking. A channel, as used herein, is defined to be a particular timeslot of a particular carrier frequency and is designated as (timeslot, carrier frequency).

The wireless station selects the first L acceptable channels and sends a feedback message to the base station providing the list of L acceptable channels for the wireless station. Upon receiving all acceptable channel lists from all wireless stations having a pending channel assignment, the base station assigns channels based on the received lists of acceptable channels and delivers the packets to all of the wireless stations by downlink packet transmission on the respectively assigned channels (step 12a), and simultaneously updates the channel priority order (step 12b). The channel priority order is updated at the base station by swapping relatively lower priority rankings of newly selected channels with relatively higher priority rankings of channels that were not selected by the wireless station. If multiple radios are used at a base station, a list is updated for each radio based on the measurements performed by all wireless stations using the same radio. In this manner, the base station "learns" the preferred channels for each radio with each update. While steps 12a and 12b are shown in what appears to be a sequential arrangement, steps 12a and 12b are actually performed in parallel, that is, the base station performs step 12b while step 12a is being performed. Dynamic Packet Assignment process 10 is continuously repeated as packets are received at the base station for downlink transmission to the wireless station.

Figure 2:
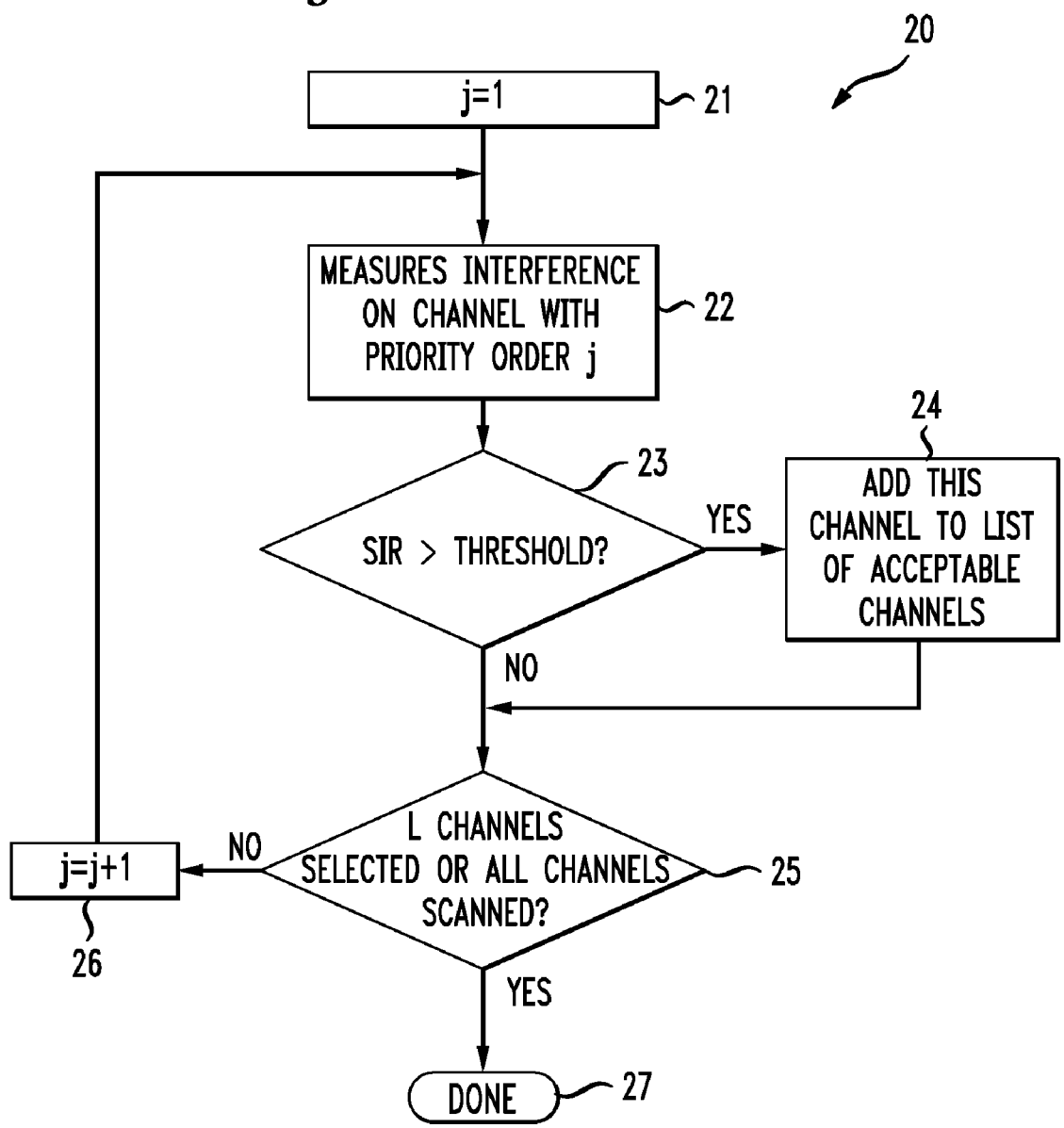
FIG. 2 is a flow diagram of a process for scanning for available channels performed by a wireless station according to the present invention.

FIG. 2 shows a flow diagram of a process 20 that corresponds to step 11 of process 10 of FIG. 1. Process 20 is performed by a wireless station when scanning for available channels. After a paging message is received indicating that there are packets for downlink transmission and indicating the priority order, an index variable j is initialized at step 21 and an FFT is performed on a pilot signal frequency band for generating a measured power for each pilot frequency signal of the pilot signal frequency band. According to the invention, the power measured for each respective pilot frequency signal corresponds to an interference level on the channel corresponding to the pilot frequency signal that is caused by downlink transmissions that are actively using the channel. Flow continues to step 22, where the interference is measured on the downlink channel having priority order j. At step 23, it is determined whether the signal to interference ratio (SIR) measured for the channel having priority order j is greater than a predetermined threshold by comparing the power of the pilot frequency signal corresponding to channel j to a predetermined threshold. Preferably, the predetermined threshold is $S/SIR_{th}$, where S is a desired signal power of a downlink transmission signal from the base station to the wireless station and is based on paging information described in connection with FIGS. 4 and 5. $SIR_{th}$ is the minimum acceptable signal to interference ratio for reliable downlink communications between a base station and a wireless station.

If the measured power of a particular pilot frequency signal is less than the predetermined threshold, flow continues to step 24 where the channel corresponding to the particular pilot frequency signal is added to the list of acceptable channels. Flow continues to step 25 where it is determined whether the number of channels added to the list of acceptable channels equals a predetermined number L, or whether all channels have been scanned. If a total of L channels have not been selected or if all channels have not been scanned, flow continues to step 26 where index variable j is incremented, and then to step 23 where it is determined whether the SIR for the next channel having priority order j is greater than the predetermined threshold. When a total of L channels have been selected or when all the channels have been scanned, flow continues to step 27 where the scanning process is exited.

Figure 3:
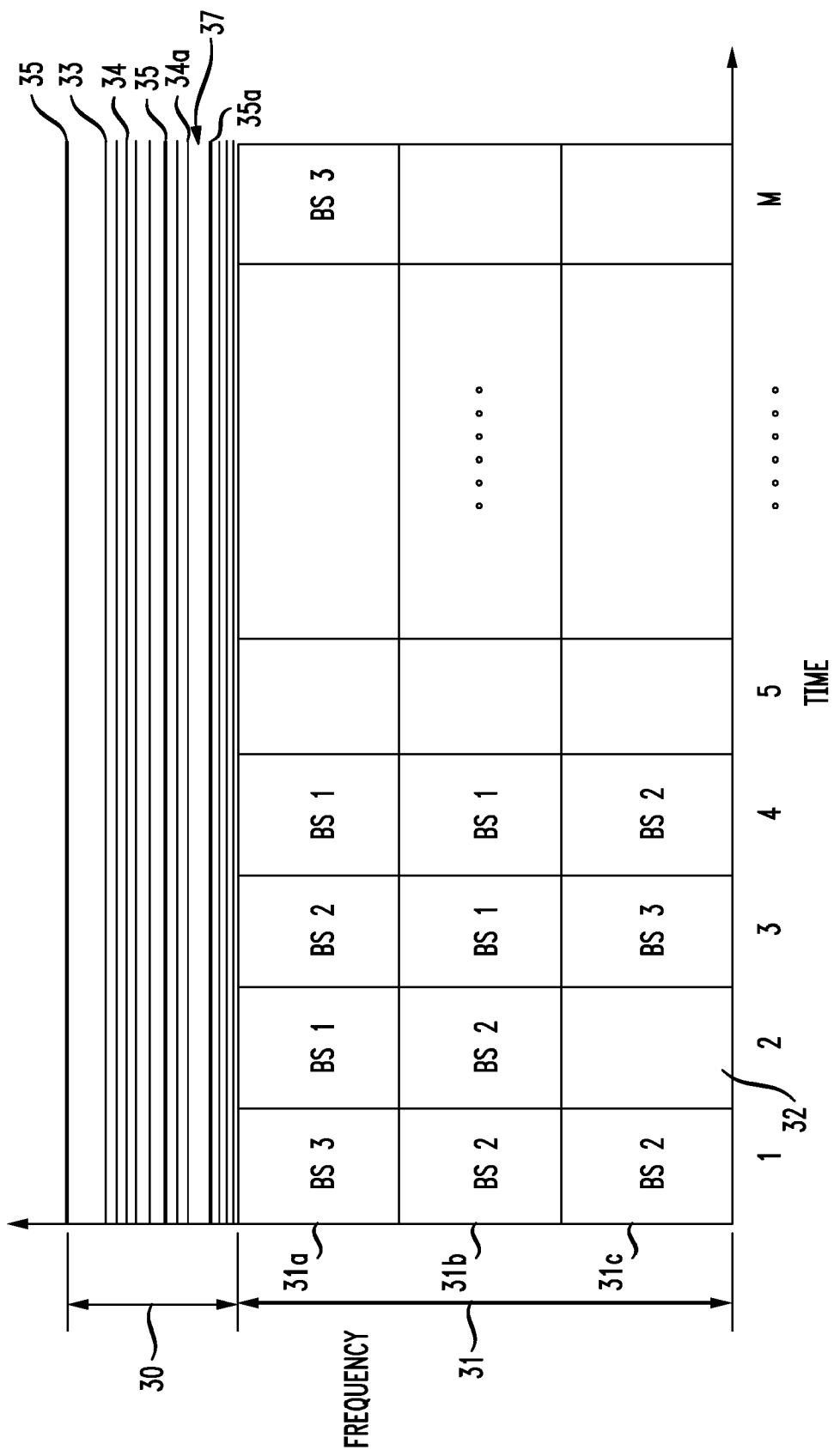
FIG. 3 depicts a frequency versus time plot for the pilot frequencies and channels according to the present invention.

FIG. 3 shows a frequency vs. time diagram of a pilot frequency band 30 and a traffic frequency band 31 according to the present invention. Pilot frequency band 30 includes a plurality of pilot frequency signals that are transmitted by base stations indicating that particular channels are assigned for downlink transmission of packets and are unavailable. Each pilot frequency signal is a narrowband signal and is spaced from other pilot frequency signals by about 10 kHz. Pilot frequency band 30 is about 1 MHz wide, so that in the arrangement shown in FIG. 3, 100 pilot frequency signals can be accommodated. Each pilot frequency signal corresponds to a channel, that is, a particular timeslot of a particular traffic carrier frequency. While pilot frequency band 30 is shown as a continuous band of frequencies, several different frequency bands can be used. Traffic frequency band 31 includes a plurality of traffic carrier signals, each having a predetermined bandwidth. FIG. 3 shows the case of three carrier frequencies (N=3). Traffic frequency band 31 may also be formed from a plurality of traffic carrier frequency bands that do not form a continuous band of frequencies, like that shown in FIG. 3. Additionally, pilot frequency band 30 and traffic frequency band 31 are not required to be adjacent frequency bands, even though pilot frequency band 30 and traffic frequency are shown in FIG. 3 as adjacent frequency bands.

When a packet is sent by a base station on the ith slot of the jth traffic carrier frequency, the base station simultaneously transmits continuous (that is, during all time slots) on the [N(i−1)+j]th pilot frequency where N is the number of traffic carrier frequencies. Pilot frequency signals transmitted by base station BS1 are shown in FIG. 3 by a narrow line like that indicated by line 33. Pilot frequency signals transmitted by base station BS2 are shown in FIG. 3 by a line having a medium width like that indicated by line 34, while pilot frequency signals transmitted by base station BS3 are shown by a thick line like that indicated by line 35. Pilot frequency signals are transmitted continuously for the duration of a frame in which the corresponding channel is being used for downlink transmission.

Traffic frequency band 31 includes a plurality of traffic carriers 31a, 31b and 31c. It should be understood that any number of traffic carriers 31 can be used. Each traffic carrier preferably has a bandwidth of at least 1 MHz and includes a frame structure having a plurality of timeslots 1 through M. When a base station has data packets for downlink transmission to a wireless station, a channel is dynamically assigned to the base station-wireless station pair. In FIG. 3, base stations BS1, BS2 and BS3, are depicted using various downlink channels represented in FIG. 3. While only three base stations are indicated in FIG. 3, the present invention is not so limited. That is, a system incorporating the present invention can have any number of base stations and wireless stations. When a burst of new packets are pending at base station BS1, for example, that are to be delivered to a wireless station, the wireless station can simply scan the pilot frequencies to find a set of channels having an acceptable SIR using the procedure detailed in connection with FIG. 2. A list of acceptable channels is sent to base station BS1, and base station BS1 selects the traffic channel for delivering the packets based on the procedure described in connection with FIG. 1.

When a channel is in use, the base station using the channel transmits the corresponding pilot frequency signal. For example, if a particular base station is using the ith time slot of the jth carrier frequency, that base station transmits the pilot frequency signal corresponding to the ith time slot for the jth carrier frequency; that is, a base station using the ith time slot of the jth carrier frequency for downlink transmission transmits pilot frequency [N(i−1)+j]. Other mapping definitions or algorithms can be used for defining a one-to-one correspondence of channels to pilot frequencies. Each base station transmits the pilot frequency signals corresponding to each channel used by the base station so that wireless stations for which new packets are pending can rapidly scan for potentially available channels. In FIG. 3, channel 32 (timeslot 2, carrier frequency 31c) is shown as available. Channels that are used are indicated in FIG. 3 by a base station designator number appearing within the channel. Additionally, the base station indicated as using a particular channel transmits a corresponding pilot frequency. The pilot frequency signal for channel 32 is not transmitted because channel 32 is depicted as not being used for downlink transmission.

In FIG. 3, pilot frequency signal 34a corresponds to channel (timeslot 4, traffic carrier 31c) which has been dynamically assigned to base station 2 for delivering packets to a wireless station. Similarly, pilot frequency signal 34a, indicated as a line having a medium thickness, represents the fact that channel (timeslot 2, traffic carrier 31b) is also used by base station BS2 to deliver packets, possibly to another wireless station. The fact that channel 32 (timeslot 2, traffic carrier 31c) is available is indicated by the lack of a pilot frequency signal being transmitted at 37. Pilot frequency signal 35a corresponds to channel (timeslot 1, traffic carrier 31a).

Figure 4:
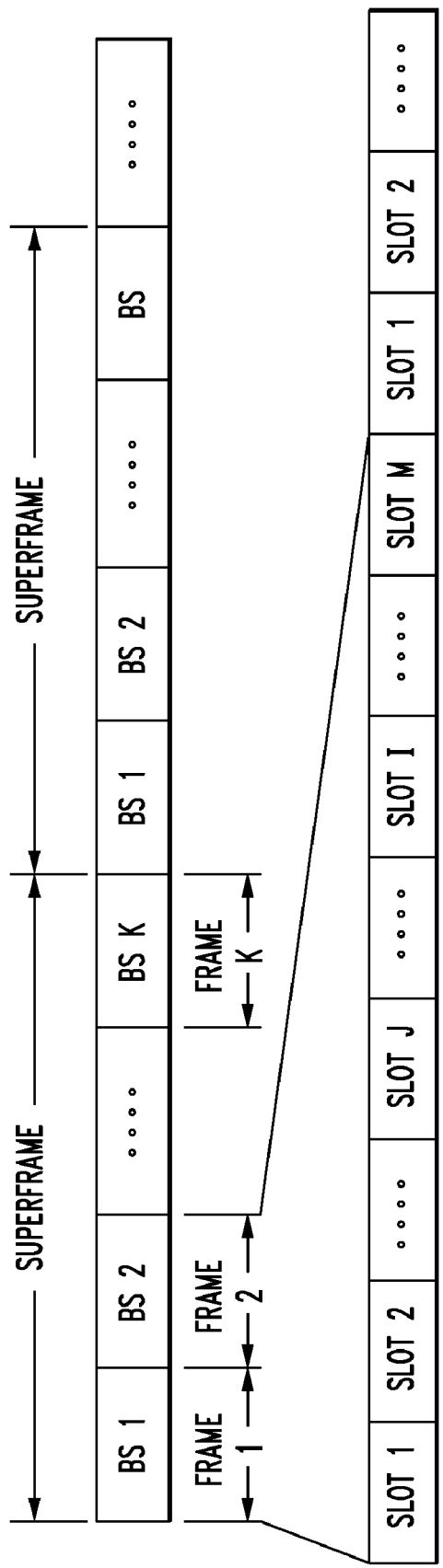
FIG. 4 depicts the ACIS frame structure according to the present invention from the point of view of the system base stations.

FIG. 4 shows the ACIS frame structure as used by the present invention. One superframe preferably includes 4 frames, but can include any number of frames K. Each frame is preferably 18 ms in duration. Each traffic carrier (FIG. 3) has the frame structure shown in FIG. 4. The specific frame structure shown in FIG. 4 shows a staggered schedule for dynamic packet assignment among neighboring base stations. The staggered frame structure is similar to a conventional token-passing arrangement in that one base station at a time is able to perform the DPA process in a small geographical area. Tokens are not specifically passed between base stations because a centralized coordination of base stations is not required by the present invention. Instead, the present invention only requires time synchronization among base stations. Similar to conventional frequency reuse concepts, a plurality of base stations can perform dynamic packet assignment simultaneously as long as they are sufficiently physically separated. This ensures that any wireless station performing interference sensing can detect all used channels in its vicinity without any blind spots, thereby avoiding any co-channel interference (inter-base collision) once the assigned channel is used to deliver pending packets. Furthermore, since the assignment is performed once every superframe, the assigned channel is updated each superframe and, thus, the degradation as time progresses is bounded if the superframe duration is selected to be reasonably short. This approach provides the flexibility of assigning more than one timeslot to a wireless station for providing a throughput in accordance with a QoS requirement.

During timeslot 1, which is a Dynamic Packet Assignment (DPA) frame for base station BS1, in which the channels are assigned for packets to be delivered during the next superframe, base station BS1 turns off pilot frequency signals corresponding to the traffic channels currently being used by base station BS1. The pilot frequency signals are turned off for the entire frame so that the wireless stations associated with base station BS1 can monitor pilot frequency signals generated by other base stations. Base station BS1 transmits paging information during timeslot 1 alerting the wireless stations for which the packets received from the network are to be directed. During timeslot 2 through the last timeslot of the frame (timeslot M), base station BS1 transmits data packets over channels that have been previously assigned (FIG. 3) for the current time frame. The control information for the DPA process for new packets can be transmitted on a specific control frequency. The base station can be equipped with a separate transceiver for handling control information to assign channels for the next superframe over a dedicated control channel while continuing to deliver packets on previously assigned channels for the current superframe using the regular transmitter. The paging information is also used for informing a particular wireless station which specific timeslot to use for sending the preferred channel list back to base station BS1 and of the priority order for the wireless station. For example, in FIG. 4, the preferred list from a particular wireless station (wireless #1) is received during timeslot J. Base station BS1 coordinates the schedule for feedback information using the paging information to avoid collisions with other wireless stations. During timeslot I, which is a timeslot occurring after all feedback information has been received by base station BS1, base station BS1 transmits assigned channels for the next superframe. A channel remains assigned until all the received data packets for a particular wireless station have been transmitted, or until DPA updating for the next superframe.

During frame 2 of the superframe structure shown in FIG. 4, base station BS2 performs the same DPA functions that base station BS1 performed during frame 1. However, from the point of view of base station BS2, base station BS2 performs the DPA functions during frame 1 of a superframe that is associated with base station BS2 and is staggered, or offset, from the superframe shown in FIG. 4 by 1 frame. That is, according to the invention, the DPA functions are scheduled to occur during frame 1 of a superframe. There are a plurality of superframes that are staggered from one another by one frame.

During timeslot 1 of frame 2 of the superframe structure shown in FIG. 4, base station BS2 turns off pilot frequency signals corresponding to traffic channels currently being used by base station BS2. Base station BS2 transmits paging information during timeslot 1 of frame 2 to wireless stations for which the packets are pending. During timeslots 2 through the last timeslot of the frame (timeslot M), base station BS2 transmits data packets over channels that have been previously assigned for the current superframe (associated with base station BS2). In the paging information transmitted by base station BS2, a particular wireless station (wireless #2) is informed which specific timeslot to send the preferred channel list back to base station BS2 and of the priority order for the wireless station. For example, the paging information transmitted by base station BS2 informs wireless #2 to transmit the preferred channel list during timeslot J-1 and the current priority order for wireless #2. During timeslot J, base station BS2 receives preferred channel lists from wireless #2. Like base station BS1, base station BS2 coordinates the schedule for feedback information using the paging information to avoid collisions with other wireless stations. During timeslot I, which is a timeslot occurring after all feedback information has been received by base station BS2, base station BS2 transmits assigned channels for the next superframe for base station BS2.

Figure 5:
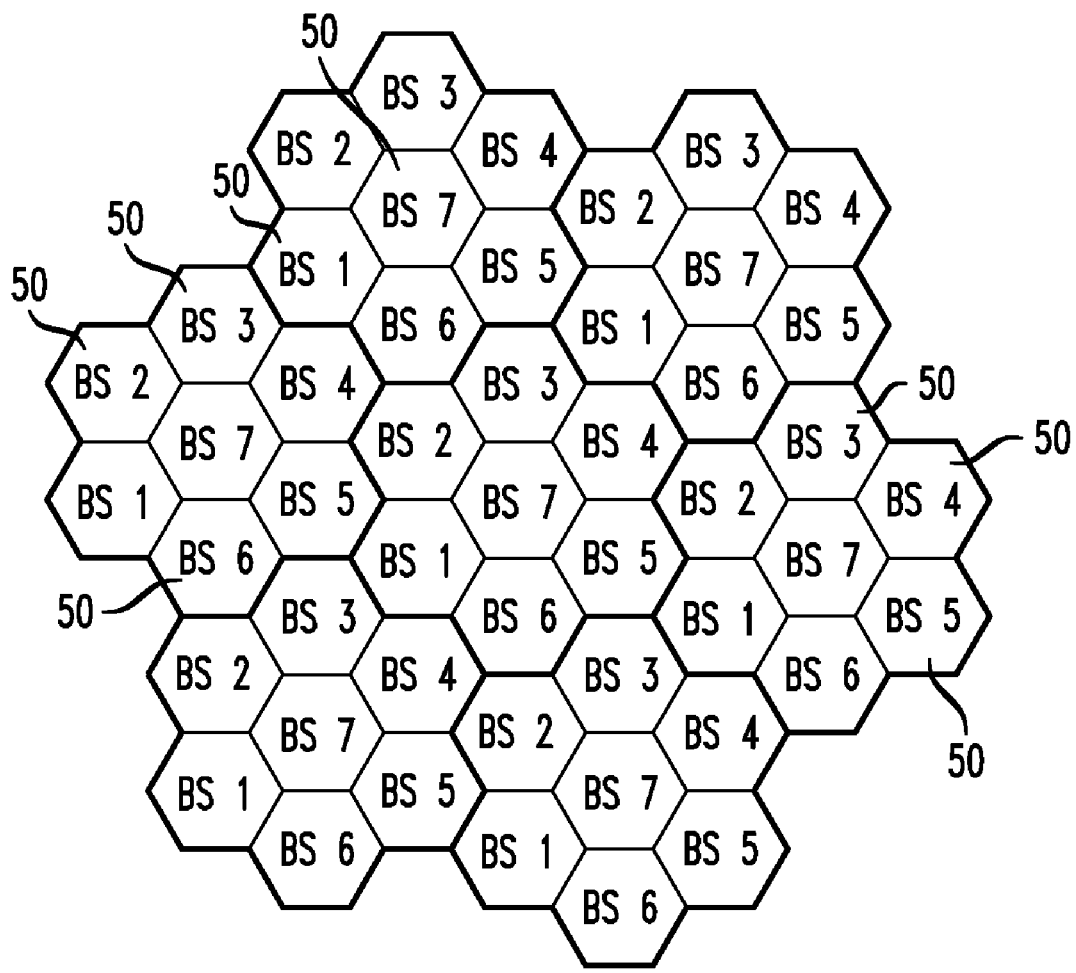
FIG. 5 depicts a plurality of wide area cells in which there are a number of base stations designated for transmitting paging information in the same timeslot according to the present invention.

This process continues for base station BS3 and so on until all K neighboring base stations in a cluster have been accounted for. In each case, each respective base station performs DPA functions during frame 1 of a superframe associated with the base station. A plurality of geographically separated clusters is formed by different clusters of K neighboring base stations. According to the invention, a number of selected base stations transmit paging information during any given frame. The base stations are selected to be sufficiently geographically separated so that downlink control signals do not significantly interfere with one another. FIG. 5 shows an exemplary arrangement (K=7) of a plurality of wide area cells 50 in which there are a number of base stations designated to be base station BS1, base station BS2, etc. While FIG. 5 shows wide area cells 50, the present invention is also applicable for when cells 50 are PCS cells in a personal communications system (PCS) network.

Figure 6:
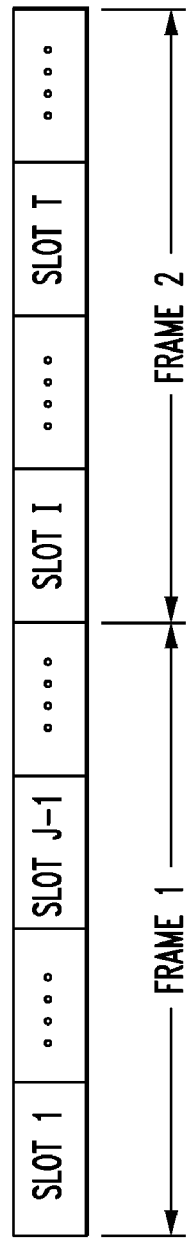
FIG. 6 depicts the ACIS structure according the present invention from the point of view of a wireless station.

FIG. 6 shows the ACIS structure according the present invention from the point of view of a wireless station, for example, wireless #1 described in connection with FIG. 4. During timeslot 1, wireless #1 receives paging information from a base station over the control traffic carrier indicating that the base station has packets for downlink transmission to wireless #1. Wireless #1 measures the pilot frequency signals within the pilot frequency band and generates a preferred channel list. During timeslot J-1, wireless #1 transmits the preferred channel list over the control traffic carrier. The base station associated with the wireless station receives the preferred channel list during timeslot J. Timeslot J at wireless #1 is defined to be later in time than slot J-1 at base station BS1. During timeslot I, the wireless #1 receives the channel assignment over the control traffic carrier that has been broadcast by the associated base station during timeslot I. In this case, wireless #1 is assigned to receive packets on channel (timeslot T, carrier frequency F). During the next frame (and all subsequent frames of the same superframe), wireless #1 receives a transmitted packet in the assigned channel.

Figure 7:
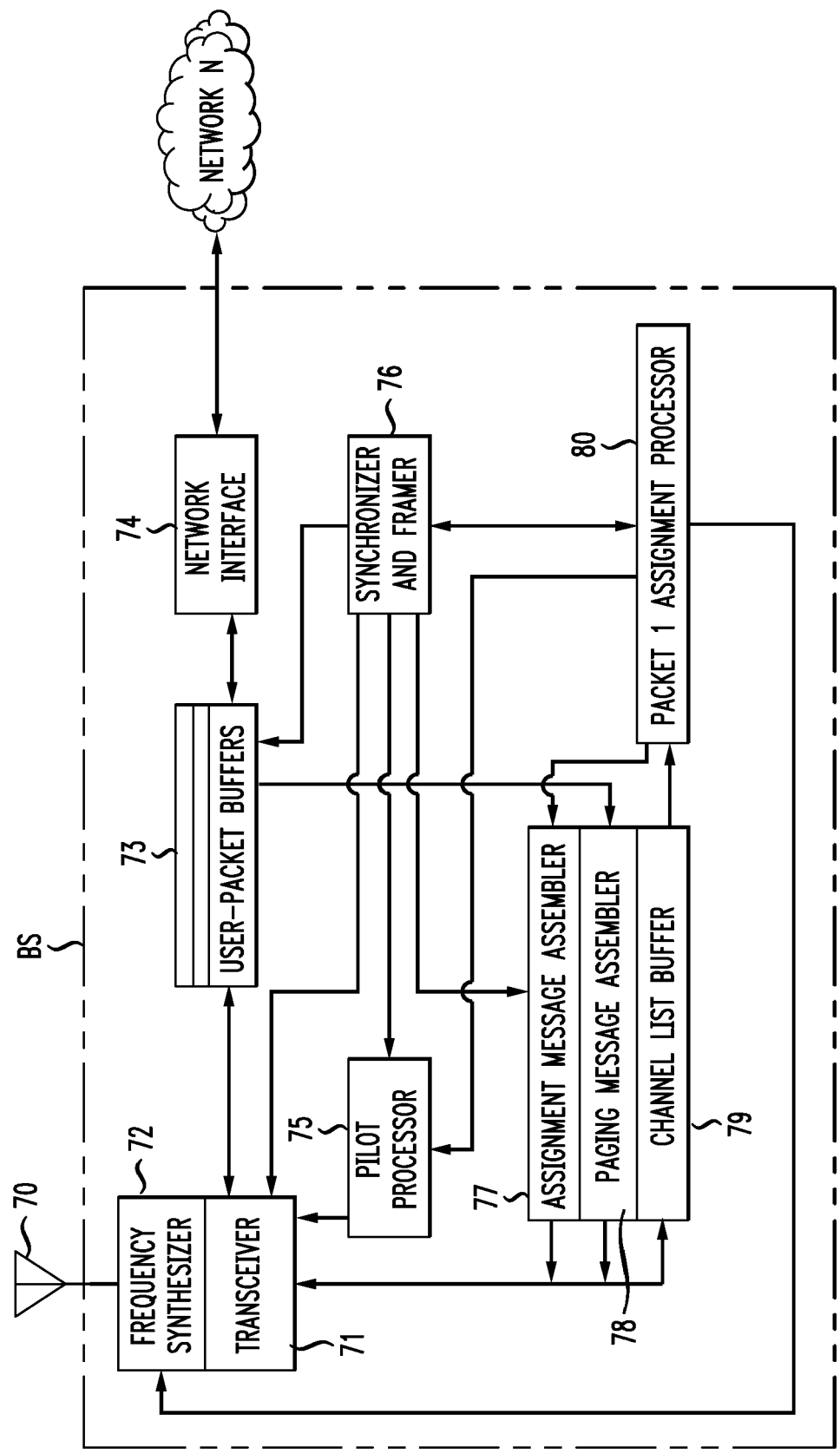
FIG. 7 is a functional block diagram of a base station according to the present invention.

FIG. 7 shows a functional block diagram of a base station BS for performing downlink functions according to the present invention. Base station BS includes an antenna 70, a transceiver 71 having a frequency synthesizer 72, user-packet buffers 73, a network interface 74, a pilot processor 75, a synchronizer and framer 76, an assignment message assembler 77, a paging message assembler 78, a channel list buffer 79 and a packet assignment processor 80. Base station BS is connected to telecommunications network N through network interface 74 and receives packets through network interface 74 for downlink transmission to wireless stations. The received packets are stored in a well-known manner in user-packet buffers 73. In response to receipt of packets for downlink transmission to a wireless station, paging message assembler 78 generates a paging message for the wireless station(s) to which the received packet(s) are to be transmitted. Paging message assembler 78 is synchronized by synchronizer and framer 76 so that the paging message is transmitted by transceiver 71 during the appropriate timeslot in the control traffic carrier.

Transceiver 71 receives preferred channel lists from wireless stations that have been paged. The preferred channel lists are stored in channel list buffer 79. In response, packet assignment processor 80 selects a preferred channel for each wireless station for downlink transmission of received packets. Information relating to the selected preferred channel for each wireless station is sent to frequency synthesizer 72, pilot processor 75, and assignment message assembler 77. Assignment message assembler 77 assembles a channel assignment message. Transceiver 71 transmits the channel assignment message during the appropriate timeslot in the control traffic carrier, as controlled by synchronizer and framer 76. During the frame in which the packet is transmitted, pilot processor 75 causes transceiver 71 to transmit a pilot frequency corresponding to the assigned channel. Additionally, the received packets are sent from user-packet buffer 73 to transceiver 71 for downlink transmission to the wireless station. Frequency synthesizer 72 generates an appropriate carrier frequency for the channel assignment and for the pilot frequency.

Figure 8:
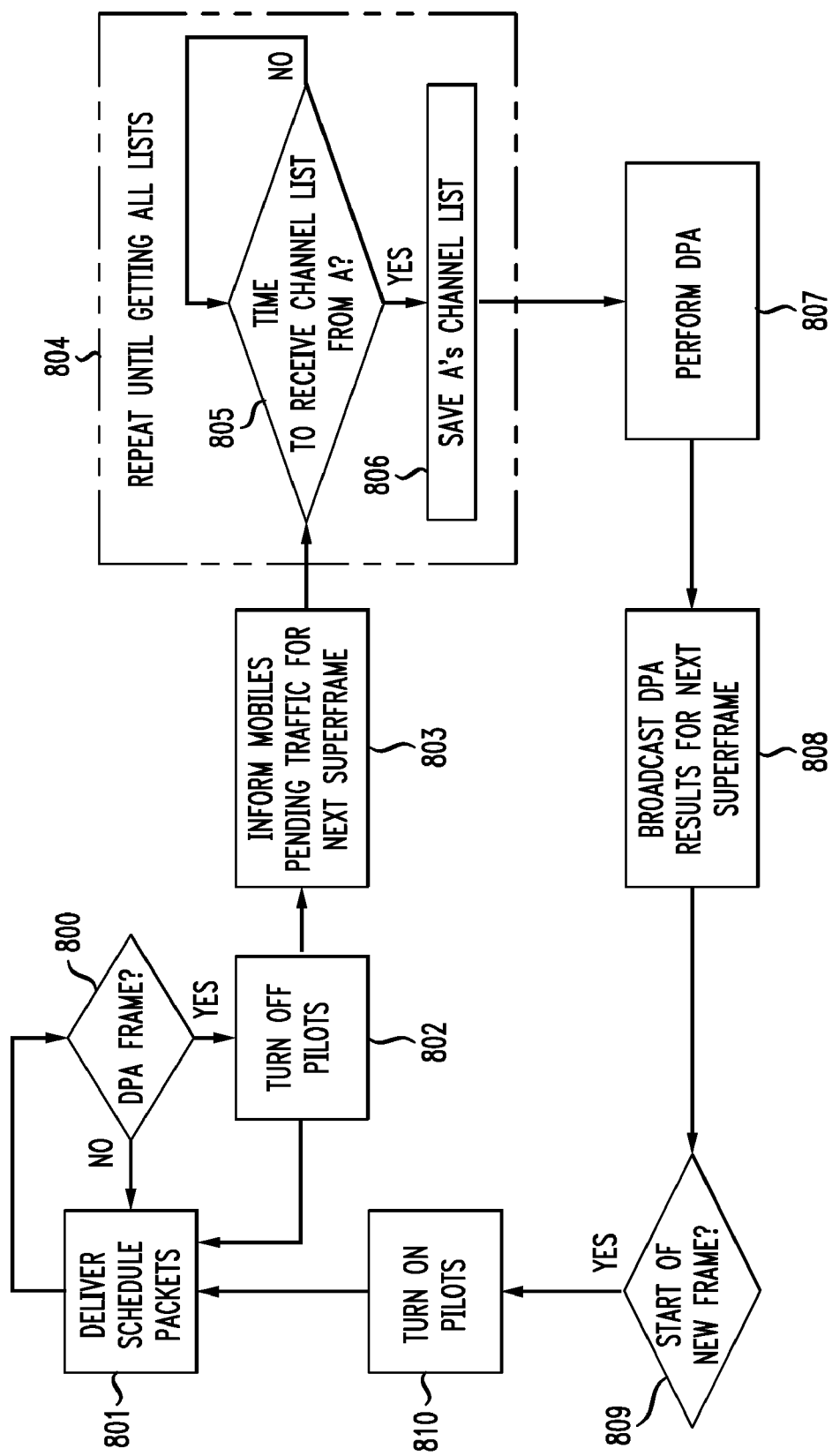
FIG. 8 is a flow diagram for dynamic packet assignment for base station according to the present invention.

FIG. 8 shows a flow diagram for dynamic packet assignment for a base station according to the present invention. At step 800, it is determined whether it is a Dynamic Packet Assignment (DPA) frame for the base station. If it is not a DPA frame, flow continues to step 801 where packets that were scheduled during the previous superframe are delivered over their assigned channels. If it is a DPA frame, the pilot frequencies that correspond to channels that are assigned for the current frame are turned off at step 802 for the entire frame. If there are packets to be delivered during the DPA frame using the preassigned channel, flow continues to step 801 where packets that were scheduled during the previous frame are delivered over their assigned channels. Flow continues to step 803 where a paging message is generated and sent during timeslot 1 of the current control traffic frame for informing wireless stations of pending traffic that is to be downlinked during the next superframe. Flow continues to step 804, where it is determined at step 805 whether it is the appropriate timeslot for receiving the preferred channel list from each wireless station that was paged. If it is not an appropriate timeslot, flow continues until it is an appropriate timeslot. When it is an appropriate timeslot, a received preferred channel list is stored at step 806. When all lists have been received and stored, dynamic channel assignment is performed at step 807 based on the preferred channel list for each wireless station for which packets are pending. At step 808, the assigned channels are broadcast. At step 809, it is determined whether it is the start of a new frame. If so, flow continues to steps 810 and 801 where appropriate pilot frequencies are transmitted corresponding to the assigned channels, and scheduled packets are delivered.

Figure 9:
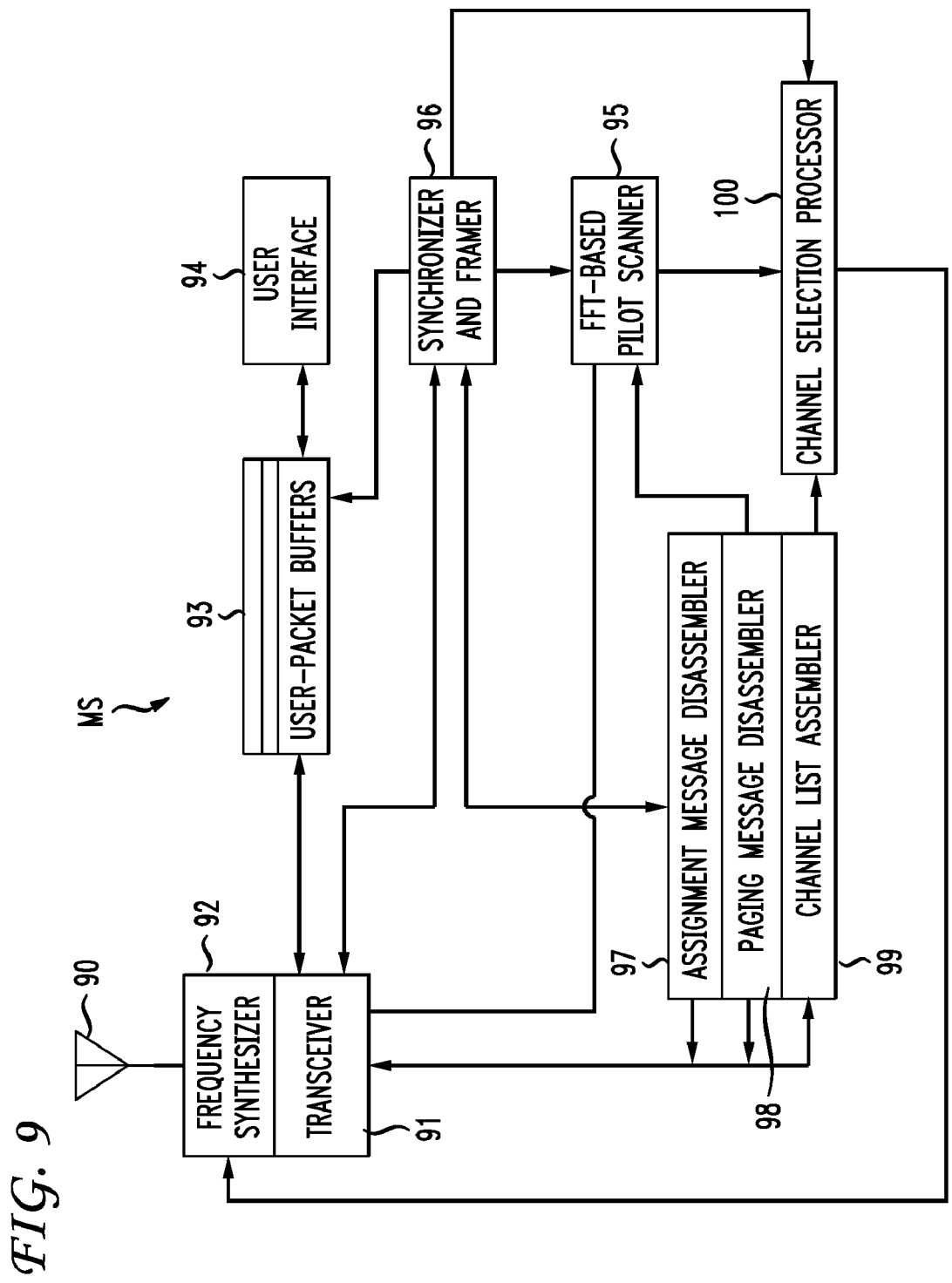
FIG. 9 is a functional block diagram for dynamic packet assignment for a wireless station according to the present invention.

FIG. 9 is a functional block diagram for dynamic packet assignment for a wireless station WS according to the present invention. Wireless station WS can be mobile or fixed. Wireless station WS includes an antenna 90, a transceiver 91 having a frequency synthesizer 92, a user-packet buffer 93, a user interface 94, an FFT-based pilot scanner 95, a synchronizer and framer 96, an assignment message disassembler 97, a paging message disassembler 98, a channel list message assembler 99 and a channel selection processor 100. When wireless station WS receives a paging message from a base station BS indicating that the wireless station has packets that are pending, the paging message is disassembled by paging message disassembler 98. The disassembled paging message causes FFT-based pilot scanner 96 to perform an FFT on the pilot frequency band for determining which channels are available. The results of the FFT are sent to the channel selection processor 100 which selects preferred channels based on the relative magnitude of detected pilot frequencies. If a pilot frequency is detected to be below a predetermined threshold, then channel selection processor 100 determines that the channel corresponding to the particular pilot frequency is available and the particular pilot frequency is added to the preferred channel list.

Preferred channels are sent to channel list message assembler 99. The preferred channel list is then transmitted to the base station by transceiver 91 under control of the synchronizer and framer 96. The channel assignment message transmitted by the base station is received by the wireless station and disassembled by assignment message disassembler 97. The contents of the channel assignment message are used for controlling frequency synthesizer 92, and by synchronizer and framer 96 for controlling transceiver 91 and user-packet buffer 93 for receiving packets transmitted in the assigned channel.

Figure 10:
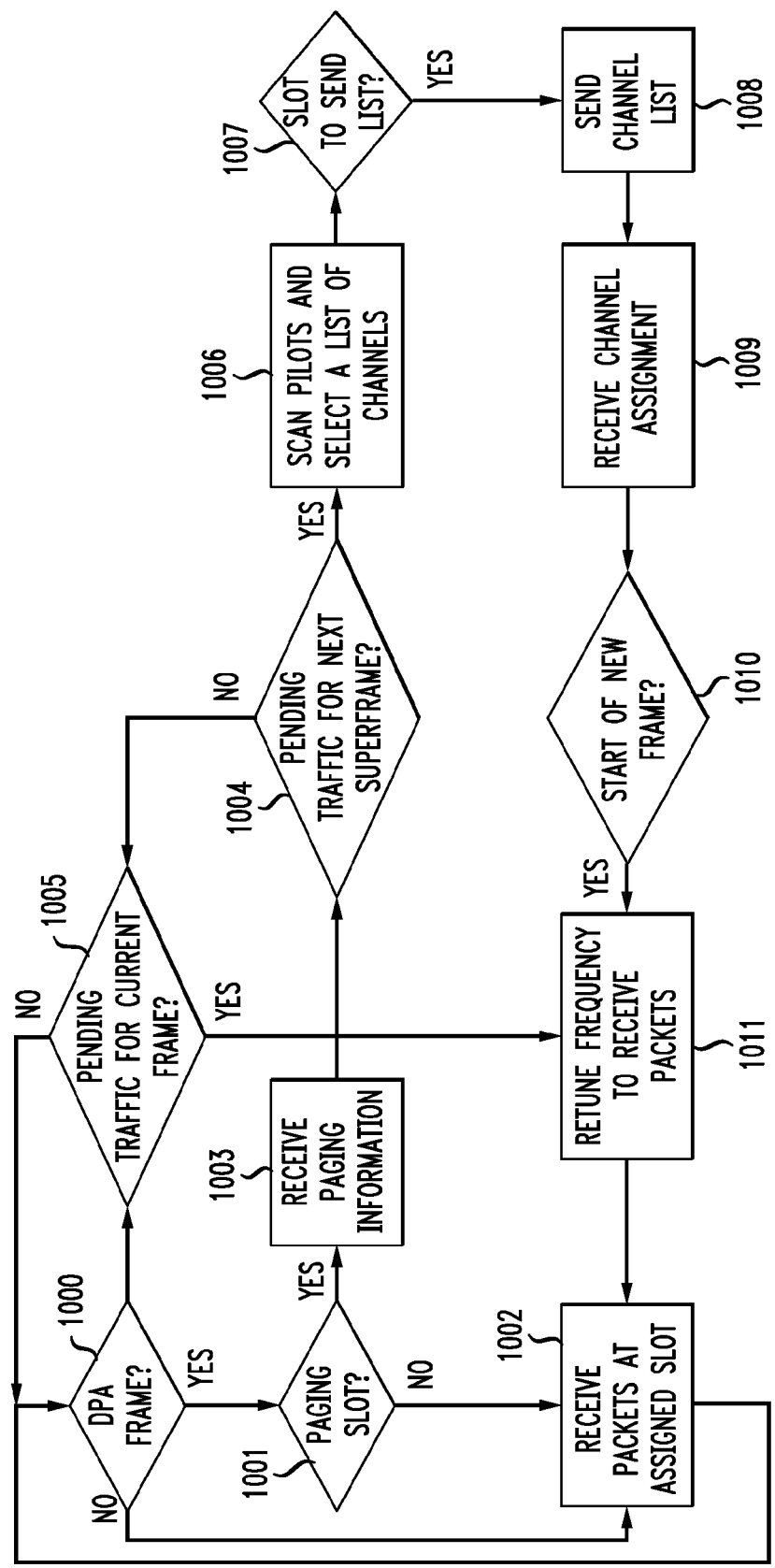
FIG. 10 is a flow diagram for dynamic packet assignment for a wireless station according to the present invention.

FIG. 10 shows a flow diagram for dynamic packet assignment for a wireless station according to the present invention. At step 1000, it is determined whether the current frame is a dynamic packet assignment (DPA) frame. If not, flow continues to step 1002 where any pending packets that have been preassigned are received over a preassigned channel. Flow continues back to step 1000. If it is determined that the current frame is a DPA frame, flow continues to step 1001 where it is determined whether the current slot is a paging slot. If not, flow continues to step 1002. If it is determined that the current slot is a paging slot, flow continues to step 1003 where paging information is received at the wireless station.

Flow continues to step 1004 where it is determined whether the received paging information indicates that there are packets pending for the wireless station for the next superframe. If the paging information indicates that there are no packets for the wireless station, flow continues to step 1005, where it is determined whether the pending traffic is scheduled for the current superframe. If not, flow continues to step 1000. If the pending traffic is for the current superframe, flow continues to step 1011 where the frequency synthesizer is retuned for receiving the packets.

If there are packets for delivery to the wireless station for the next superframe, flow continues to step 1006 where the wireless station scans the pilot frequencies and selects a list of preferred channels. At step 1007, it is determined whether it is the proper timeslot for sending the preferred channel list to the base station. When it is the proper timeslot, flow continues to step 1008 where the preferred channel list is sent. At step 1009, the channel assignment is received from the base station for the pending packets. At step 1010, it is determined whether it is the start of the next frame. At the start of the next frame, flow continues to step 1011 where the frequency synthesizer is retuned for receiving the packets. Flow continues to step 1002 where the packets are received by the wireless station.

Figure 11:
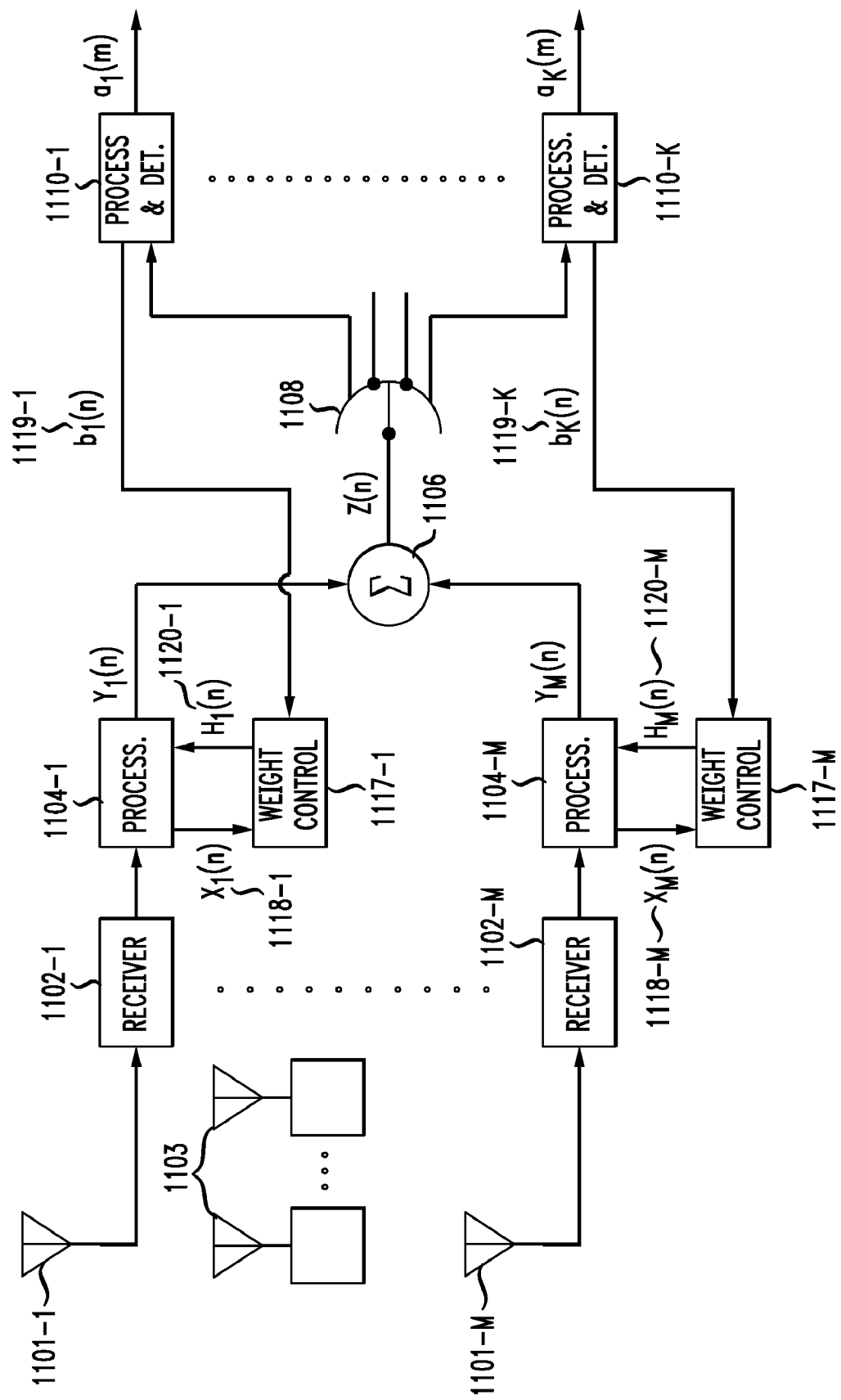
FIG. 11 is a functional block diagram depicting a base station having an M-element adaptive array and a plurality of mobile terminals.

FIG. 11 illustrates a base station having an M-element adaptive array 1101-1 through 1101-M and a plurality of wireless stations 1103. Each element of the M-element adaptive array of the base station is associated with a respective wideband tunable receiver 1102-1 through 1102-M and a respective processor 1104-1 through 1104-M. Receivers 1102-1 through 1102-M each use a mixer with a local oscillator (not shown) to translate the bandwidth of interest (e.g., the bandwidth that embraces the number of mobile radio channels assigned in the band to which the receivers are currently tuned), down to an IF and to filter out unwanted frequencies. Receivers 1102-1 through 1102-M may advantageously be tunable to cover all, or a portion of, the mobile band, e.g., 10 MHz at 900 MHz in IS-54 or AMPS. The receivers may also be tunable to other bands, such that the same unit can be easily modified for use at other frequencies, e.g., 1.8 GHz.

Processors 1104-1 through 1104-M each include an A/D converter, a FFT module, and a multiplier (which are not shown). The signal from each receiver is A/D converted at a sampling rate sufficient to allow for reconstruction of the received signal, typically two times the bandwidth.

In the processors 1104-1 through 1104-M, blocks of 2N samples are converted to the frequency domain using FFT modules. The frequency domain data blocks which represent the received signal short term spectra, $X_1$ (n), i=1, . . . , M, n=1, . . . , 2N, are then presented to multipliers. These multipliers implement frequency domain filtering by multiplying the frequency domain data by the frequency response corresponding to the combination of the receive filter, equalizer, and adaptive array combining weights to generate the weighted frequency spectra $Y_1$ (n) through $Y_M$ (n).

The outputs of the M multipliers, Y, (n), i=1, . . . , M, are passed to digital signal processing circuitry which includes a summer 1106. The summer output, Z(n), is the short-term frequency spectrum of the output signals.

The separation of the individual channels and conversion to the time domain takes advantage of the fact that each channel is represented in the summer output, Z(n), over the n corresponding to that channel, i.e., Z(1) through Z(L) is the frequency spectrum of channel 1, Z(L+1) through Z(2L) is the frequency spectrum of channel 2, etc. Thus, to separate each channel and convert to the time domain, a commutator 1108 distributes the Z(n), n=1, . . . , 2N, to a bank of processors and detectors 1110-1 through 1110-K, one for each of the K channels. That is, Z(1) through Z(L) is sent to processor and detector 1110-1, Z (L+1) through Z (2L) is sent to processor and detector 1110-2, and so forth. Processor and detectors 1110-1 through 1110-K determine the received data symbols $a_1$ (m) through $a_K$ (m) corresponding to the received signal samples. These data symbols are the data received by the base station and are coupled to the frequency synthesizer in a well-known manner.

The weights $H_1$ (n) through $H_M$ (n) are input to the bank of processors 1104-1 through 1104-M. These weights are determined from both frequency domain received data, $X_i$ (n), i= 1, . . . , M, (1118-1 through 1118-M) and the time domain output data, $b_j$ (n), j=1, . . . , K, (1119-1 through 1119-K). Weight control circuitry 1117-1 through 1117-M uses frequency domain received data on input lines 1118-1 through 1118-M and time domain output data on lines 1119-1 through 1119-K to generate the weights used on output lines 1120-1 through 1120-M for processors 1104-1 through 1104-M, respectively.

Figure 12:
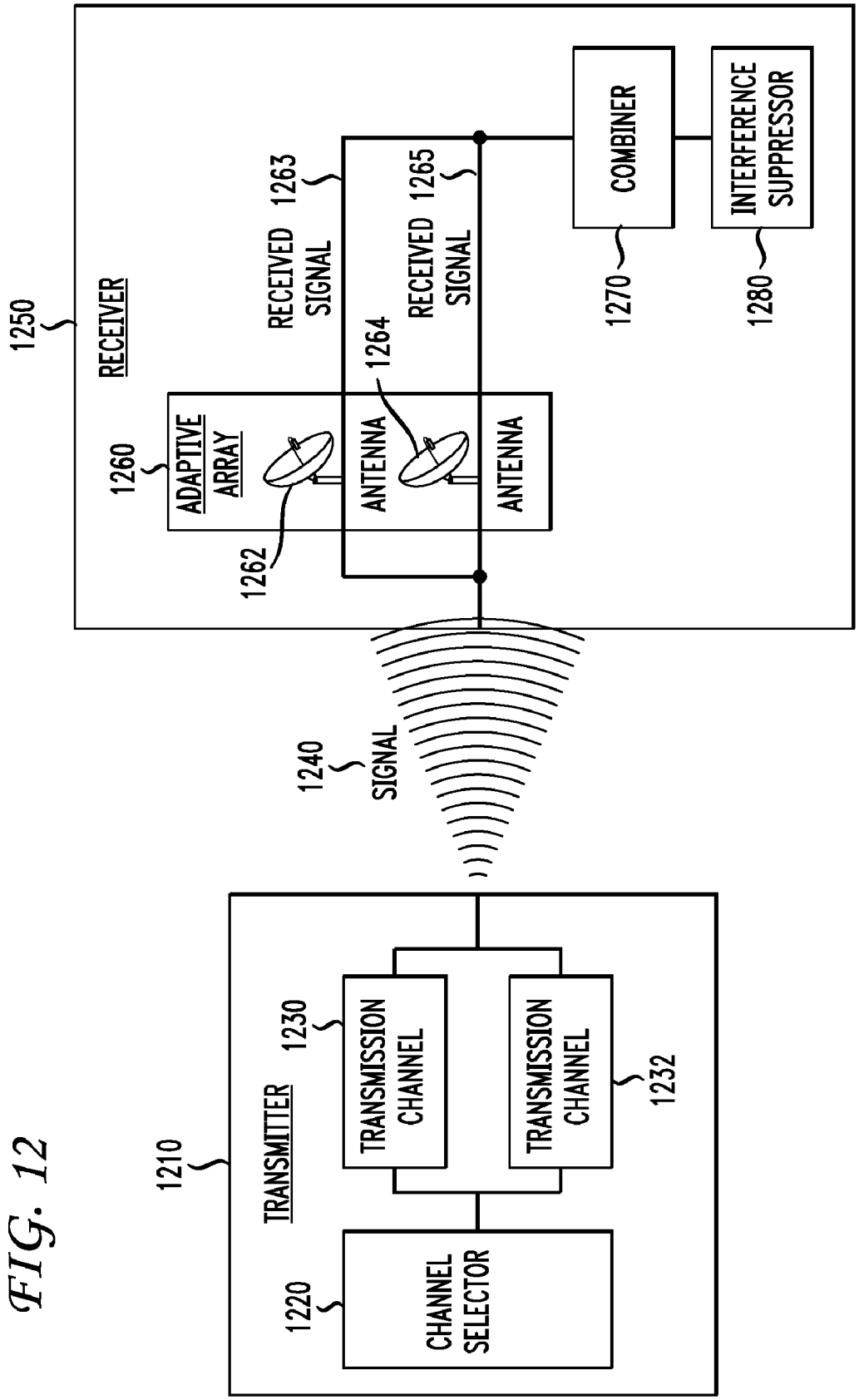
FIG. 12 is a functional block diagram that depicts according to the present invention communication between a transmitter and a receiver.

FIG. 12 is a functional block diagram that illustrates communication of a signal 1240 between a transmitter 1210 and a receiver 1250. In the preferred embodiment, the transmitter 1210 includes a channel selector 1220 and at least two transmission channels 1230, 1232. In alternative embodiments, different transmission frequencies, different transmission times, or different CMDA codes and an appropriate type of selector can substitute, respectively, for the transmission channels 1230, 1232 and the channel selector 1220. The receiver 1250 in the preferred embodiment includes an adaptive array 1260, a combiner 1270, and an interference suppressor 1280. The adaptive array 1260 includes at least two antennas 1262, 1264 to receive the signal 1240 and produce at least two received signals 1263, 1265. The combiner 1270 synthesizes the received signals 1263, 1265 into a combined signal. The interference suppressor 1280 processes the combined signal by applying an interference suppression technique. The interference suppression technique may include Minimum Mean-Square Error (MMSE), Maximum Signal-to-Interference Ratio (MSIR), Minimum Variance (MV), Maximum Likelihood Estimate (MLE), Parametric Maximum Likelihood (PML), Chirp-Least-Squares algorithm with Clipping (CLSC), or Least-Mean-Squared (LMS).

When the transmitter 1210 prepares to transmit a signal 1240 to the receiver 1250, the channel selector 1220 selects the best performing transmission channel from the available transmission channels 1230, 1232. The channel selector 1220 examines the performance of each transmission channel at the receiver 1250 to select the best performing channel. To have the channel assignment not place interferers close together, the channel is selected that has the best performance (e.g., the lowest interference) without interference suppression at the receiver 1250. The determination of the best performing channel is made under the assumption that the receiver 1250 is using a combining technique that is not the same as the interference suppression technique performed by the interference suppressor 1280.

The present invention is advantageously applied to a wireless communication system that includes an adaptive array. In wireless systems with multiple traffic channels available, transmission channel assignment can be used to choose the best channel for each communication. This can be done on a per circuit or per packet basis using the present invention. As would we known in the art, the various base stations, wireless stations, and other components can be controlled by instructions stored on a tangible computer-readable medium. Such a tangible computer-readable medium includes such hardware components as RAM, ROM, hard drives, and the like and excludes signals per se, energy, or a wireless interface.

Although the embodiments disclosed in the present invention describe a fully functioning system, it is to be understood that other equivalent embodiments exist. Since numerous modifications and variations will occur to those who review this disclosure, the present invention is not limited to the exact construction and operation illustrated and described herein. Accordingly, this disclosure intends all suitable modifications and equivalents to fall within the scope of the claims.

We claim:

1. A non-transitory computer-readable medium storing instructions for controlling a communication system to select a channel, the instructions causing the communication system to perform steps comprising:

communicating a signal from a transmitter having at least two transmission channels to a receiver;

at the receiver, producing from a received signal at least two received signals, the receiver having an adaptive array with at least two antennas to receive the received signal;

suppressing interference at the receiver by applying an interference suppression technique that includes minimum mean square error combining when combining said at least two received signals; and selecting a channel at the transmitter based on channel performance at the receiver for each of said at least two transmission channels, the channel performance based on a combining technique that includes switched diversity combining and that is different from the interference suppression technique.

2. The non-transitory computer-readable medium of claim 1, wherein the receiver communicates with at least two transmitters.

3. The non-transitory computer-readable medium of claim 1, wherein the transmitter is a mobile terminal and the receiver is a base station.

4. The non-transitory computer-readable medium of claim 1, wherein the transmitter is a base station and the receiver is a mobile terminal.

5. The non-transitory computer-readable medium of claim 1, wherein the combining technique further includes maximum ratio combining.

6. The non-transitory computer-readable medium of claim 1, wherein the combining technique further includes diversity combining.

7. The non-transitory computer-readable medium of claim 1, wherein the combining technique further includes equal gain combining.

8. A non-transitory computer-readable medium storing instructions for controlling communication between a transmitter and a receiver to select a transmission channel, the instructions comprising:
communicating a signal from the transmitter to the receiver, the transmitter having at least two transmission channels;
receiving the signal at a receiver having an adaptive array, the adaptive array having at least two antennas to receive the signal and produce at least two received signals;
suppressing interference at the receiver by applying an interference suppression technique that includes minimum mean square error combining when combining said at least two received signals; and
selecting the transmission channel at the transmitter based on channel performance at the receiver for each of said at least two transmission channels, channel performance based on a combining technique that includes switched diversity combining and that is different from the interference suppression technique.

9. The non-transitory computer-readable medium of claim 8, wherein the receiver communicates with at least two transmitters.

10. The non-transitory computer-readable medium of claim 8, wherein the transmitter is a mobile terminal and the receiver is a base station.

11. The non-transitory computer-readable medium of claim 8, wherein the transmitter is a base station and the receiver is a mobile terminal.

12. The non-transitory computer-readable medium of claim 8, wherein the combining technique further includes maximum ratio combining.

13. The non-transitory computer-readable medium of claim 8, wherein the combining technique further includes selection diversity combining.

14. The non-transitory computer-readable medium of claim 8, wherein the combining technique further includes equal gain combining.

15. A non-transitory computer-readable medium storing instructions for controlling a receiver in a wireless communication system to select a channel, the receiver having an adaptive array comprising at least two antennas to receive a signal from a transmitter having at least two transmission channels and to produce at least two received signals, the instructions causing the receiver to perform steps comprising:
suppressing interference by applying an interference suppression technique that includes minimum mean square error combining when combining the at least two received signals; and
selecting a channel at the transmitter based on channel performance at the receiver for each of at least two transmission channels, the channel performance based on a combining technique that includes switched diversity combining and that is different from the interference suppression technique.

16. A non-transitory computer-readable medium storing instructions for operating a transmitter having at least two transmission channels in a wireless communication system to communicate with a receiver, the transmitter communicating with the receiver having an adaptive array having at least two antennas to receive the signal and produce at least two received signals, wherein the receiver suppresses interference by applying an interference suppression technique that includes minimum mean square error combining when combining the at least two received signals, the instructions causing the transmitter to perform steps comprising:
receiving a signal from the receiver indicating a selection of one of the at least two transmission channels based on channel performance at the receiver for each of the at least two transmission channels, wherein the channel performance is based on a combining technique that includes switched diversity combining and that is different from the interference suppression technique; and
communicating with the receiver using the selected one of the at least two transmission channels.

* * * * *